(12) United States Patent
Miki

(10) Patent No.: US 11,294,753 B2
(45) Date of Patent: Apr. 5, 2022

(54) INFORMATION PROCESSING APPARATUS AND METHOD FOR COLLECTING COMMUNICATION CABLE LOG

(71) Applicant: FUJITSU LIMITED, Kawasaki (JP)

(72) Inventor: Atsushi Miki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/066,509

(22) Filed: Oct. 9, 2020

(65) Prior Publication Data

US 2021/0165706 A1 Jun. 3, 2021

(30) Foreign Application Priority Data

Nov. 29, 2019 (JP) .............................. JP2019-215910

(51) Int. Cl.
| | |
|---|---|
| *G06F 11/00* | (2006.01) |
| *G06F 11/07* | (2006.01) |
| *H04B 10/25* | (2013.01) |
| *G06F 13/40* | (2006.01) |

(52) U.S. Cl.
CPC ...... *G06F 11/0787* (2013.01); *G06F 11/0736* (2013.01); *G06F 11/0751* (2013.01); *G06F 13/4027* (2013.01); *H04B 10/25* (2013.01)

(58) Field of Classification Search
CPC ............. G06F 11/1402; G06F 11/1446; G06F 11/1448; G06F 11/1458; G06F 11/0787; G06F 11/0736; G06F 11/0751; G06F 11/0772; G06F 13/4027; G06F 13/4063; G06F 11/0778; H04B 10/25

USPC ........................................................ 714/1–57
See application file for complete search history.

(56) References Cited

U.S. PATENT DOCUMENTS

| | | | | |
|---|---|---|---|---|
| 5,668,351 | A * | 9/1997 | Hanlon ............... | B60R 16/0215 174/68.3 |
| 6,038,678 | A * | 3/2000 | Fukushima .......... | H04L 12/437 370/244 |
| 6,802,040 | B1 * | 10/2004 | Ohyama ........... | H03M 13/1535 714/781 |
| 7,016,957 | B2 * | 3/2006 | Morimoto ........... | G06F 11/0709 709/224 |
| 8,742,786 | B2 * | 6/2014 | Komura ......... | G01R 31/318533 324/762.01 |
| 2004/0163011 | A1* | 8/2004 | Shaw ..................... | H04L 63/12 714/25 |
| 2005/0171713 | A1* | 8/2005 | Taniguchi .......... | G01D 5/24457 702/69 |

(Continued)

FOREIGN PATENT DOCUMENTS

| | | |
|---|---|---|
| JP | H11-31091 A | 2/1999 |
| JP | 2004-145321 A | 5/2004 |

*Primary Examiner* — Sarai E Butler
(74) *Attorney, Agent, or Firm* — Fujitsu Patent Center

(57) ABSTRACT

The communication cable comprising a first failure information region that stores first failure information and a second failure information region that stores second failure information, and in a case where a communication failure occurs, the manager apparatus reads the first failure information from the first failure information region, and the communication controller apparatus reads the second failure information from the second failure information region. With this configuration, in a case where a communication failure occurs, correlated failure information can be easily and surely obtained.

8 Claims, 5 Drawing Sheets

(56) References Cited

U.S. PATENT DOCUMENTS

| | | | |
|---|---|---|---|
| 2006/0075291 A1* | 4/2006 | Takahashi | G11B 20/1883 714/6.32 |
| 2006/0193091 A1* | 8/2006 | Joukou | H03K 17/127 361/23 |
| 2008/0201616 A1* | 8/2008 | Ashmore | G06F 11/0778 714/57 |
| 2012/0117432 A1* | 5/2012 | Fujisaki | G11C 29/56008 714/719 |
| 2014/0047280 A1* | 2/2014 | Chamberlain | G06F 11/0793 714/45 |
| 2016/0092289 A1* | 3/2016 | Otsuka | G06F 11/0751 714/37 |
| 2018/0239663 A1* | 8/2018 | Miki | G06F 11/0787 |
| 2019/0121561 A1* | 4/2019 | Okamura | G06F 3/0683 |
| 2020/0043254 A1* | 2/2020 | Hase | G08G 1/0112 |

\* cited by examiner

INFORMATION PROCESSING APPARATUS AND METHOD FOR COLLECTING COMMUNICATION CABLE LOG

CROSS-REFERENCE TO RELATED APPLICATION

This application is based upon and claims the benefit of priority of the prior Japanese Patent application No. 2019-215910, filed on Nov. 29, 2019, the entire contents of which are incorporated herein by reference.

FIELD

The embodiment discussed herein is related to an information processing apparatus and a method for collecting a communication cable log.

BACKGROUND

In recent years, optical communication is becoming dominant in inter-computer communication due to increase in transmission capacity and transmission speed. In a parallel processing apparatus formed by communicably connecting multiple computers (nodes) to one another, an example of a device used for inter-node optical communication is an Active Optical Cable (AOC) serving as a communication cable that connects servers.

An AOC has dedicated Integrated Circuits (ICs) incorporated in connectors at the both ends of an optical cable. These dedicated ICs carries out electric/optical conversion to achieve electric communication with a computer side and optical communication with an optical cable side.

A large number of AOCs are used in an apparatus that connects a large number of Central Processing Units (CPUs) through an optical communication network and that executes a large-scale parallel computing. For instance, a supercomputer "Fugaku" (registered trademark) uses about 100,000 AOCs.

In the use of an AOC, a maintenance operation is required through determining a failure point, a wrong connection point, inferior connection, and the like. However, a larger number of AOCs makes it more difficult, to determine a failure point or the like to increase the time required for the maintenance operation.

Collecting a detailed log when a failure occurs is indispensable for improvement of the efficiency of the maintenance operation. The log has two types of a "System Event Log" (SEL) and an analysis log. An SEL is information representing a change in state occurring on the computer, and an analysis log is detailed failure information at the time of occurrence of the SEL. Hereinafter, analysis log is sometimes referred to as a "DUMP". A DUMP includes two types of information, i.e., a type of failure (DETAIL) and a point of occurring (REGION).

A computer includes a Baseboard Management Controller (BMC). A BMC is a monitoring controller apparatus that executes monitoring and maintenance of the computer. The BMC writes an SEL representing a change in state occurring on the computer into an SEL registration storage. In addition, the BMC writes detailed failure log (analysis log) at the time of occurrence of the SEL into a log registration storage.

[Patent Document 1] Japanese Laid-open Patent Publication No. 11-31091

[Patent Document 2] Japanese Laid-open Patent Publication No. 2004-145321

A BMC stores log information collected at various points of a computer into a log registration storage. For example, the BMC collects failure information from various units exemplified by AOCs and an Integrated Communication Controller (ICC), and stores the collected failure information into a log registration storage. Consequently, various pieces of information (logs) are stored in the log registration storage. In cases where a communication failure occurs in a computer, the maintenance staff grasps the level of the failure with reference to the SEL and determines the maintenance point with reference to the DUMP.

Since various pieces of information collected in the computer is stored in the log registration storage as described above, it is difficult to collect logs related to the detected failure from among the information stored in the log registration storage.

For example, the maintenance staff determines the interrelationship between logs by referring to the time stamps and the place of collection of the logs registered in the log registering storage. This manner of determination is complex.

Here, in a computer system to make the maintenance staff to easily determine the interrelationship between multiple logs registered in the log registering storage, it is conceivable that the BMC stores, when the ICC detects communication abnormality, failure information of the ICC and the failure information of an AOC at the time of occurrence of a failure into the log registration storage in combination with each other.

FIG. 1 is a diagram schematically illustrating an inter-node communication unit 500 of an information processing system related to a typical information processing apparatus.

The inter-node communication unit 500 exemplarily illustrated in FIG. 1 is included in each information processing apparatus of a parallel processing apparatus configured by communicably interconnecting multiple information processing apparatus (nodes), for example. The inter-node communication unit 500 is used in one of the information processing apparatuses for inter-node communication with another information processing apparatus.

As illustrated in FIG. 1, the inter-node communication unit 500 includes a BMC 510, an ICC 520, and an AOC 530.

The BMC 510 is a monitoring controller apparatus that executes monitoring and maintenance of the computer, and includes a BMC processor 511, an SEL registration storage 512, and a log registration storage 513. The BMC processor 511 is connected to the SEL registration storage 512 via a signal line 541 and to the log registration storage 513 via a signal line 542.

The SEL registration storage 512 stores information (SEL) representing a change in state occurring on the computer. The log registration storage 513 stores detailed failure information (analysis log) at the time of occurrence of the SEL.

Furthermore, the BMC processor 511 is connected to an ICC processor 521 via a signal line 543 and to an AOC processor 531 via a signal line 546. The signal line 546 is also used as an interrupting signal line that inputs an interrupting signal from the AOC processor 531 to the BMC processor 511.

The ICC 520 is a communication controller apparatus that controls communication with another information processing apparatus. The ICC 520 is disposed between the BMC 510 and the AOC 530. The ICC processor 521 and the AOC processor 531 are connected to each other via a signal line 547. The signal line 547 is also used as an interrupting signal line that inputs an interrupting signal from the ICC processor 521 to the AOC processor 531.

The ACC 530 includes the AOC processor 531 and an AOC register 532. The AOC processor 531 and an AOC register 532 that are exemplarily illustrated in FIG. 1 are both mounted on each of connectors disposed at the both ends of the ACC 530. The AOC processor 531 and an AOC register 532 illustrated in FIG. 1 are ones disposed on one end side of the AOC 530 connected to the inter-node communication unit 500.

Into a predetermined storing region (failure information region) of the AOC register 532, information (AOC failure information) related to a failure detected in the AOC 530 is stored. The AOC processor 531 achieves various functions by executing the firmware. For example, the AOC processor 531 reads AOC failure information from the AOC register 532. Here, in AOC 530, the AOC processor 531 deletes a value of the AOC register 532 once the AOC processor 531 reads the value from the AOC register 532 in the use of a known common standard. This means that information stored in the AOC register 532 is removed when toeing once read by the AOC processor 531.

The ICC 520 includes the ICC processor 521 and an ICC register 522. Into a predetermined storing region (failure information region) of the ICC register 522, information (ICC failure information) related to a failure detected in the ICC 520 is stored.

For example, the following scheme is conceivable to cause, when communication abnormality is detected in the ICC 520, the BMC 510 to store failure information of the ICC 520 and failure information of the AOC 530 into the log registration storage 513 in combination with each other.

In cases where the ICC processor 521 detects a communication failure in the ICC 520, the ICC processor 521 causes the AOC processor 531 to read the contents in the AOC register 532 and receives the read contents (AOC failure information) of the AOC register 532. Then the ICC processor 521 notifies the BMC processor 511 of the AOC failure information obtained from the AOC processor 531 and the ICC failure information read from the ICC register 522 in combination with each other. The BMC processor 511 stores the received AOC failure information and the received ICC failure information into the log registration storage 513 in a state of being associated with each other.

However, the information stored in the AOC register 532 is removed if being once read by the AOC processor 531 as described above.

This means that, in cases where the AOC processor 531 reads failure information from the failure information region of the AOC register 532 in obedience to an instruction from the ICC processor 521 in the event of detection of communication abnormality in the inter-node communication unit 500, the failure information in the AOC register 532 is deleted.

Here, in cases where a failure occurs in the AOC 530, the failure information related to the failure in the AOC 530 is also stored in the AOC register 532. However, since the failure information in the AOC register 532 is deleted, the failure information related to a failure of the AOC 530 is removed from the AOC register 532. Consequently, interruption is not made from the AOC 530 to the BMC 510 to cause a circumstance where failure occurrence information of the AOC 530 is not registered in the SEL registration storage 512.

SUMMARY

According to an aspect of the embodiment, an information processing apparatus including a manager apparatus and a communication controller apparatus and being connected to another information processing apparatus via a communication cable, wherein; the communication cable comprising a first failure information region that stores first failure information and a second failure information region that stores second failure information; and in a case where a communication failure occurs, the first failure information is written into the first failure information region and the second failure information is written into the second failure information region, the manager apparatus reads the first failure information from the first failure information region, and the communication controller apparatus reads the second failure information from the second failure information region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Hereinafter, an embodiment of the present information processing apparatus and a method for collecting a communication cable log will now be described with reference to the accompanying drawings. However, the embodiment described below is merely illustrative and there is no intention to exclude the application of various modifications and techniques not explicitly described below. The present embodiment can be variously modified and implemented without departing from the scope thereof. The drawings do not intend to include only the components appearing therein, and additional components and functions can be included.

Figure 1:
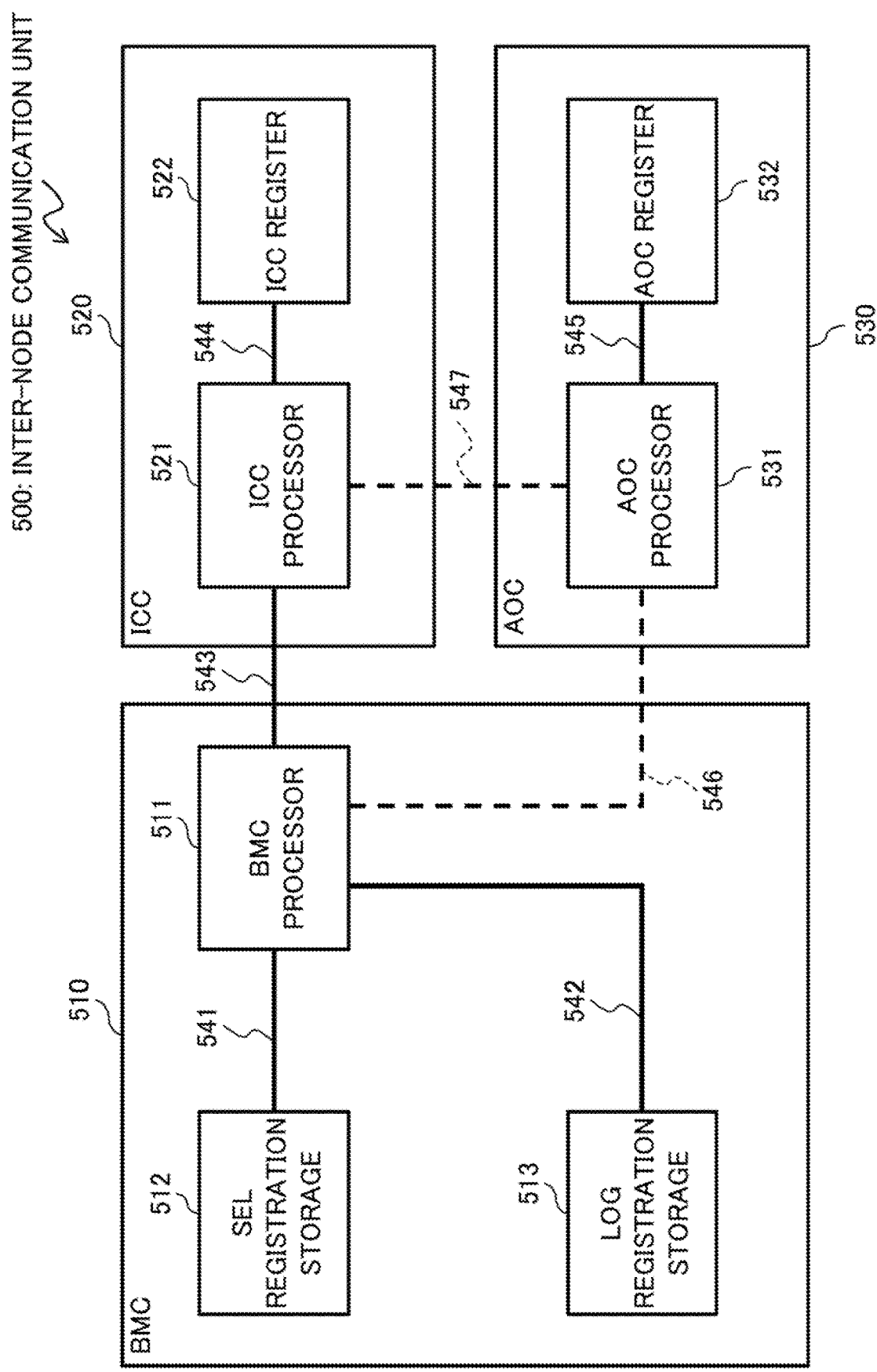
FIG. 1 is a diagram schematically illustrating an inter-node communication unit of an information processing system related to a typical information processing apparatus.
Figure 2:
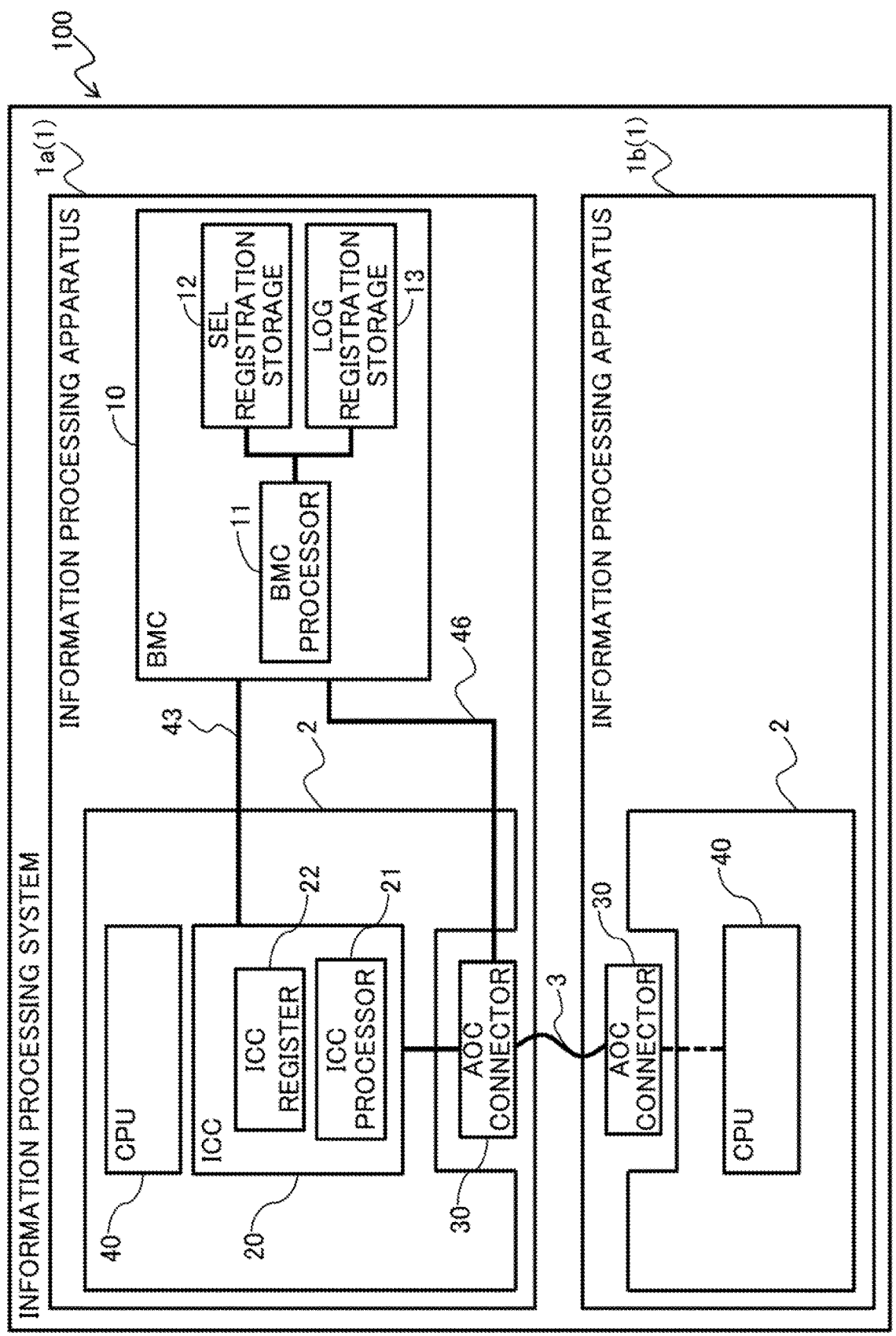
FIG. 2 is a diagram exemplarily illustrating a hardware configuration of an information processing system according to an example of an embodiment.
Figure 3:
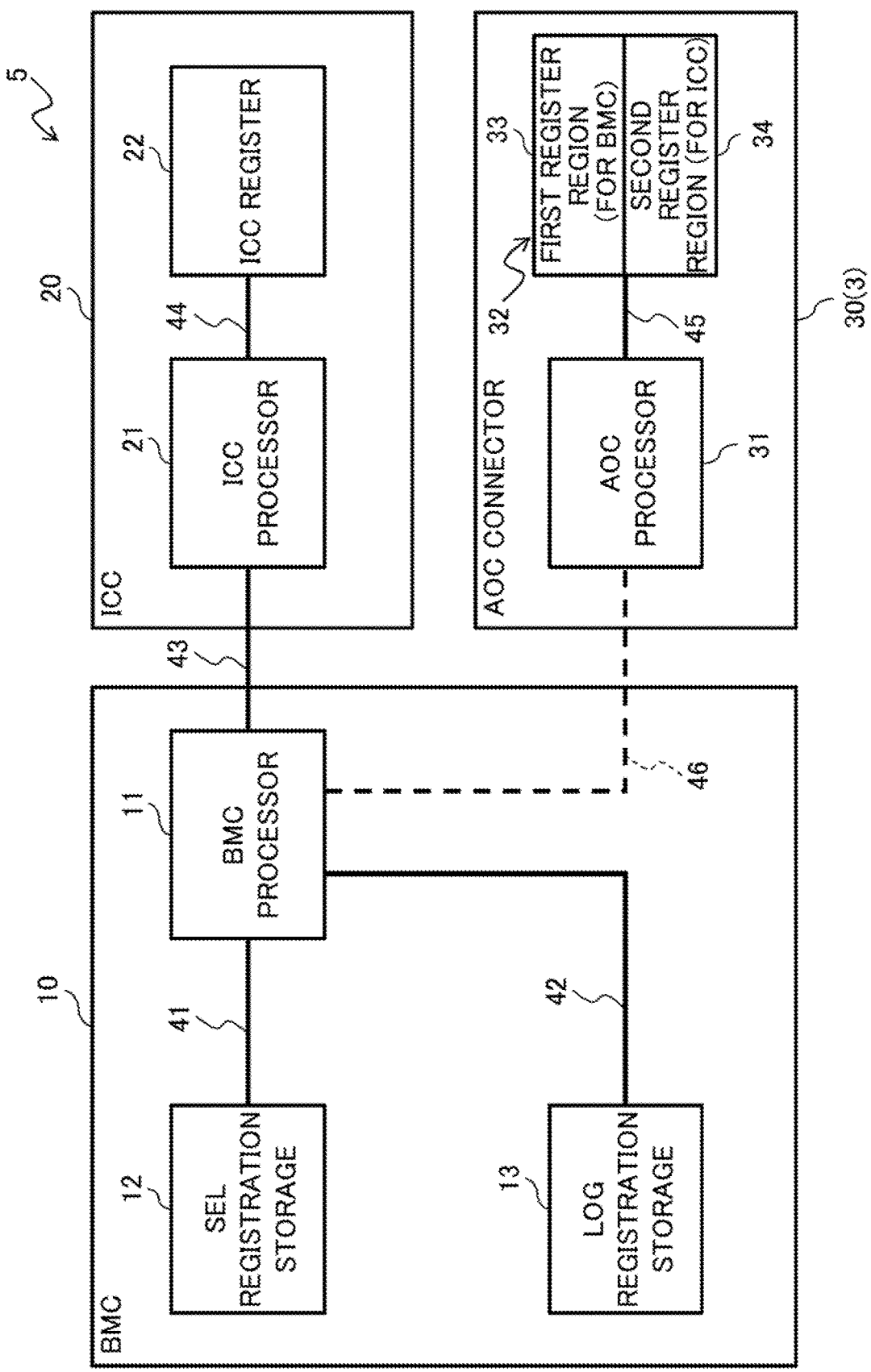
FIG. 3 is a diagram schematically illustrating a configuration of an inter-node communication unit provided to the information processing apparatus.

(A) Configuration:

FIG. 2 is a diagram exemplarily illustrating a hardware configuration of an information processing system 100 according to an example of an embodiment; and FIG. 3 is a diagram schematically illustrating a configuration of an inter-node communication unit 5 provided to an information processing apparatus 1.

As illustrated in FIG. 2, the information processing system 100 according to an example of an embodiment is a parallel processing apparatus including multiple (two in the example of FIG. 2) information processing apparatuses 1*a* and 1*b*. The information processing apparatuses 1*a* and 1*b* have the same configuration as each other. The example of FIG. 2 expediently illustrates part of the configuration of the information processing apparatus 1b. Hereinafter, the information processing apparatuses 1a and 1b, when not being discriminated from each other, are referred to as the information processing apparatuses 1. In addition, the information processing apparatuses 1 may be referred to as nodes.

The information processing apparatus 1 includes a substrate 2 and a BMC 10. On the substrate 2, a CPU 40 and an ICC 20 are mounted. In addition, a non-illustrated connector is provided to the substrate 2, and to this connector, an AOC connector 30 formed on one end of the AOC (optical cable, communication cable) 3 is connected.

Under a state where the AOC connector 30 of the AOC 3 is connected to the information processing apparatus 1, the BMC 10, the ICC 20, and the AOC connector 30 collectively function as the inter-node communication unit 5.

The CPU 40 is a processing apparatus that executes various controls and calculations, and achieves various functions through executing the Operating System (OS) and one or more programs stored in, for example, a non-illustrated memory.

(AOC 3)

As illustrated in FIG. 3, the AOC connector 30 of the AOC 3 includes an AOC processor 31 and an AOC register 32. Furthermore, another AOC processor 31 and another AOC register 32 are similarly provided to an AOC connector 30 disposed on the other end of the AOC 3, which is however omitted in the drawing.

The ACC register 32 includes a first register region 33 and a second register region 34. In the first register region 33, first AOC failure information 331 (see FIG. 4) is stored and, in the second register region 34, second AOC failure information 332 (see FIG. 4) is stored. The first register region 33 may be referred to as a first failure information region and the second register region 34 may be referred to as a second failure information region.

When a communication failure occurs, the BMC 10 to be detailed below reads communication failure information from the first register region (first failure information region) 33 and the ICC 20 reads communication failure information from the second register region (second failure, information region) 34.

Figure 4:
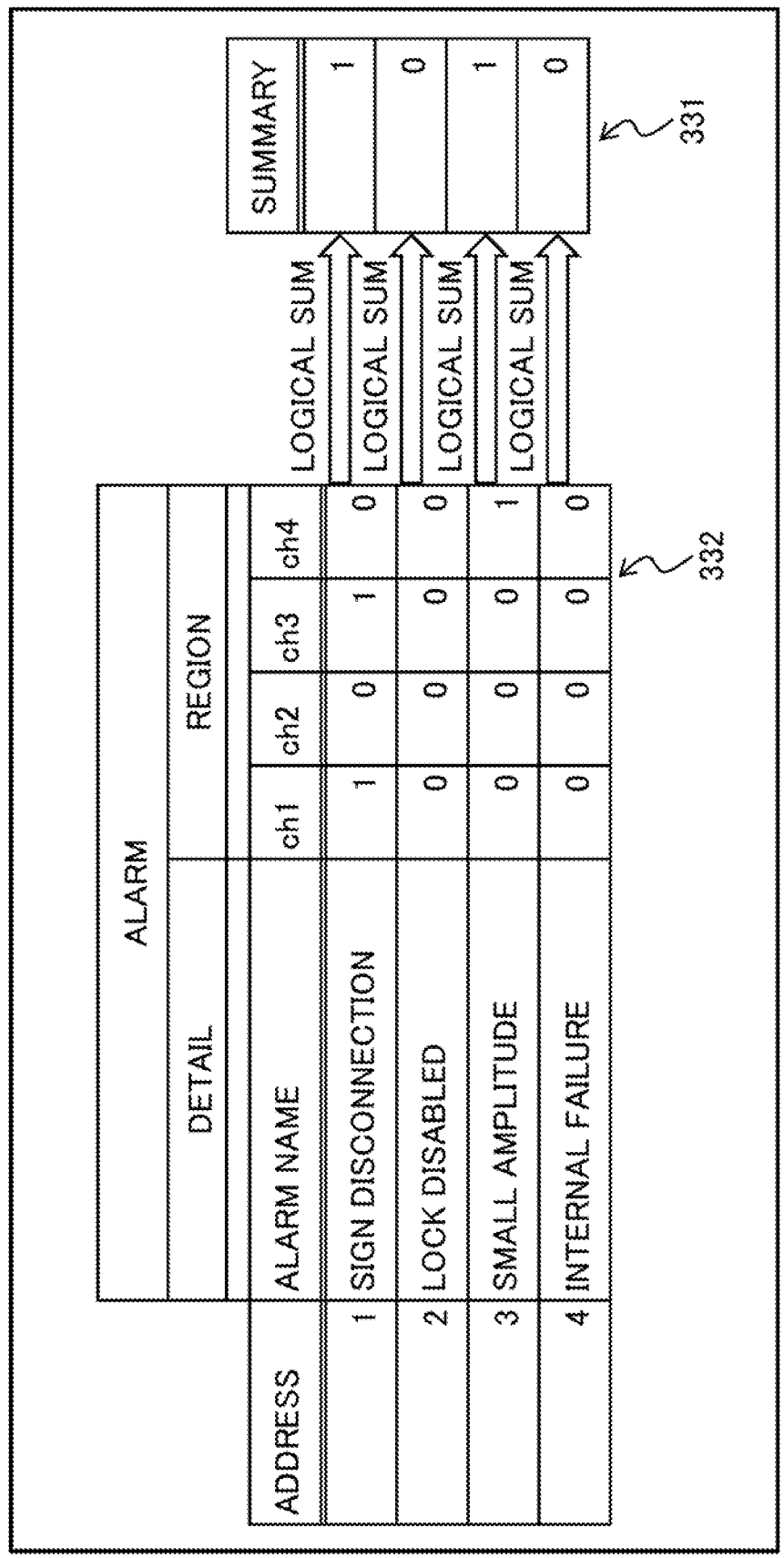
FIG. 4 is a diagram exemplarily illustrating first AOC failure information, and second AOC failure information in the information processing system according to an example of an embodiment.

FIG. 4 is a diagram exemplarily illustrates the first AOC failure information 331 and the second AOC failure information 332 in the information processing system 100 according to an example of an embodiment.

The second AOC failure information 332 is ALARM information, which includes DETAIL information and REGION information.

The DETAIL information represents the contents (alarm type) of a failure detected. In the example of FIG. 4, DETAIL information is an alarm name, and specifically items of "SIGNAL DISCONNECTION", "LOCK DISABLED", "SMALL AMPLITUDE", and "INTERNAL FAILURE" are listed as the alarm names. Furthermore, in the example of FIG. 4, unique addresses are set for the respective alarm names, and addresses 1 to 4 are set for "SIGNAL DISCONNECTION", "LOCK DISABLED", "SMALL AMPLITUDE", and "INTERNAL FAILURE", respectively. The present information processing system 100 may treat these addresses 1 to 4 as the DETAIL information. Hereinafter, the DETAIL information is sometimes simply referred to as "DETAIL".

The REGION information represents an occurring position (occurring point) specified by each alarm name. In the example of FIG. 4, ch1 to ch4 are indicated to be the REGION information. The items of ch1 to ch4 correspond to signal channels of the AOC 3. The REGION information is configured to be bit information of each signal channel of the AOC 3 for each of the alarm types (alarm names). For example, the REGION information "0" is set for a channel at which no abnormality is detected and the REGION information "1" is set for a channel at which abnormality is detected.

For example, the second AOC failure information 332 of FIG. 4 indicates a failure "SIGNAL DISCONNECTION" is detected at two positions specified by ch1 and ch3.

The registration of REGION information into the second AOC failure information 332 can be accomplished in various known method. The registration of REGION information into the second AOC failure information 332 may be accomplished by means of hardware, such as electronic circuitry, or software. Hereinafter, the REGION information is sometimes simply referred to as "REGION".

In cases where a communication failure occurs in the present information processing system 100, the second AOC failure information (second failure information) 332 is written into the second register region (second failure information region) 34.

The first AOC failure information 331 stores a logical sum of the REGION information of all the channels (in the example of FIG. 4, ch1 to ch4) for each alarm name of the DETAIL information in the second AOC failure information 332. This means that, in the first AOC failure information 331, an alarm type for which abnormality is detected at a channel in the second AOC failure information 332 is set to "1" and an alarm type for which abnormality is not detected at all the channels in the second AOC failure information 332 is set to "0".

In the example of FIG. 4, the logical sum of the ch1 to ch4 of the "SIGNAL DISCONNECTION" of the address 1 is "1", for example. Accordingly, the "SIGNAL DISCONNECTION" of the address 1 in the first AOC failure information 331 is set to "1".

In this manner, the first AOC failure information 331 represents whether or not abnormality of each alarm type indicated in the second AOC failure information 332 is detected. The first AOC failure information 331 may be referred to as SUMMARY INFORMATION or simply "SUMMARY".

In cases where a communication failure occurs in the present information processing system 100, the first AOC failure information (first failure information) 331 is written into the first register region (first failure information region) 33. The writing of the second AOC failure information 332 into the second register region 34 may be carried out by the AOC processor 31 or by another external entity.

In the AOC register 32, the second AOC failure information 332 in the second register region 34 is not removed even if the first AOC failure information 331 in the first register region 33 is read. In other words, the firmware (FM) of the AOC 3 is configured not to remove information (second AOC failure information 332) in the second register region 34 even if the first AOC failure information 331 in the first register region 33 is read. For example, the firmware of the AOC 3 excludes the second register region 34 from the targets of data removal when data is read from the AOC register 32.

In the AOC 3, the second AOC failure information 332 in the second register region 34 is deleted when the second AOC failure information 332 is read by the AOC processor 31. In other words, the firmware of the AOC 3 removes the information (second AOC failure information 332) in the second register region 34 in cases where the second AOC failure information 332 in the second register region 34 is read.

The first AOC failure information 331 (SUMMARY) in the first register region 33 is read only by the BMC 10 to be detailed below, and the second AOC failure information 332 (ALARM) in the second register region 34 is read only by the ICC 20. The BMC 10 registers the SUMMARY into the SEL registration storage 12, and the ICC 20 registers the ALARM into the log registration storage 13.

(ICC 20)

The ICC 20 is a communication controller apparatus that controls communication with another information processing apparatus 1 (in the example of FIG. 2, the information processing apparatus 1b). The ICC 20 is arranged between the BMC 10 and a communication cable. The ICC 20 includes an ICC processor 21 and an ICC register 22. Into the predetermined storing region (failure information region) of the ICC register 22, information (ICC failure information) related to a failure detected in the ICC 20 is stored.

The ICC processor 21 collects log information in the event of detection of a failure in the inter-node communication unit 5. This means that the ICC processor 21 reads failure information from the ICC register 22.

The ICC processor 21 obtains the second AOC failure information 332 (ALARM) by causing the AOC processor 31 to read the second AOC failure information 332 (ALARM) in the second register region 34 of the AOC register 32. In this manner, the ICC processor 21 obtains the second AOC failure information 332 from the second register region 34 of the AOC register 32 through the AOC processor 31.

The ICC processor 21 transmits (notifies) the collected information, i.e., the ICC failure information and the second AOC failure information 332 (ALARM), along with an instruction to store the log information to the BMC processor 11.

In addition, the ICC processor 21 has a function of detecting occurrence of a communication failure in the inter-node communication unit 5. The detection of occurrence of a communication failure in the inter-node communication unit 5 can be achieved by various known methods, which are omitted here.

(BMC 10)

The BMC 10 is a monitoring controller apparatus that executes monitoring and maintenance of the information processing apparatus 1, and includes a BMC processor 11, an SEL registration storage 12, and a log registration storage 13. As illustrated in FIG. 3, the BMC processor 11 is connected to the SEL registration storage 12 via a signal line 41 and to the log registration storage 13 via a signal line 42.

The BMC processor 11 is connected to the ICC processor 21 via a signal line 43 and to the AOC processor 31 via a signal line 46. The signal line 46 is also used as an interrupting signal line that inputs an interrupting signal from the AOC processor 31 to the BMC processor 11.

The SEL registration storage 12 stores information (SEL) representing a change in state occurring on the computer. Specifically, the SSL registration storage 12 stores the first AOC failure information 331 (SUMMARY) that the ICC processor 21 reads from, the first register region 33 via the BMC processor 11.

The log registration storage 13 stores detailed failure information (analysis log) at the time of occurring the SEL. Specifically, into the log registration storage 13, the second AOC failure information 332 read from the second register region 34 of the AOC register 32 and the ICC failure information read from the ICC register 22 are stored by the BMC processor 11 in a state of being associated with each other.

This means that the log registration storage 13 functions as a failure information storing unit that stores the failure information (ICC failure information) that the ICC 20 collects and the second AGO failure information 332 that the ICC 20 reads from the second register region 34 of the AOC register 32 (via the AOC processor 31) in association with each other.

In the event of detection of a communication failure in the inter-node communication unit 5, the BMC processor 11 stores the first AOC failure information 331 (SUMMARY) read from the first register region 33 of the AOC register 32 into the SEL registration storage 12.

Upon receipt of the ICC failure information and the ALARM (second AOC failure information 332) along with the instruction to store the log information from the ICC processor 21, the BMC processor 11 stores the log information that is associated with the received ICC failure information and the received ALARM into a predetermined region of the log registration storage 13. In the log information, the ICC failure information and the ALARM, which are obtained at the timing of detection of the same failure, can be treaded information pieces correlated with each other.

The BMC processor 11 has a function of detecting occurrence of a communication failure in the inter-node communication unit 5. The detection of occurrence of a communication failure in the inter-node communication unit 5 can be achieved by various known methods, which are omitted here.

Figure 5:
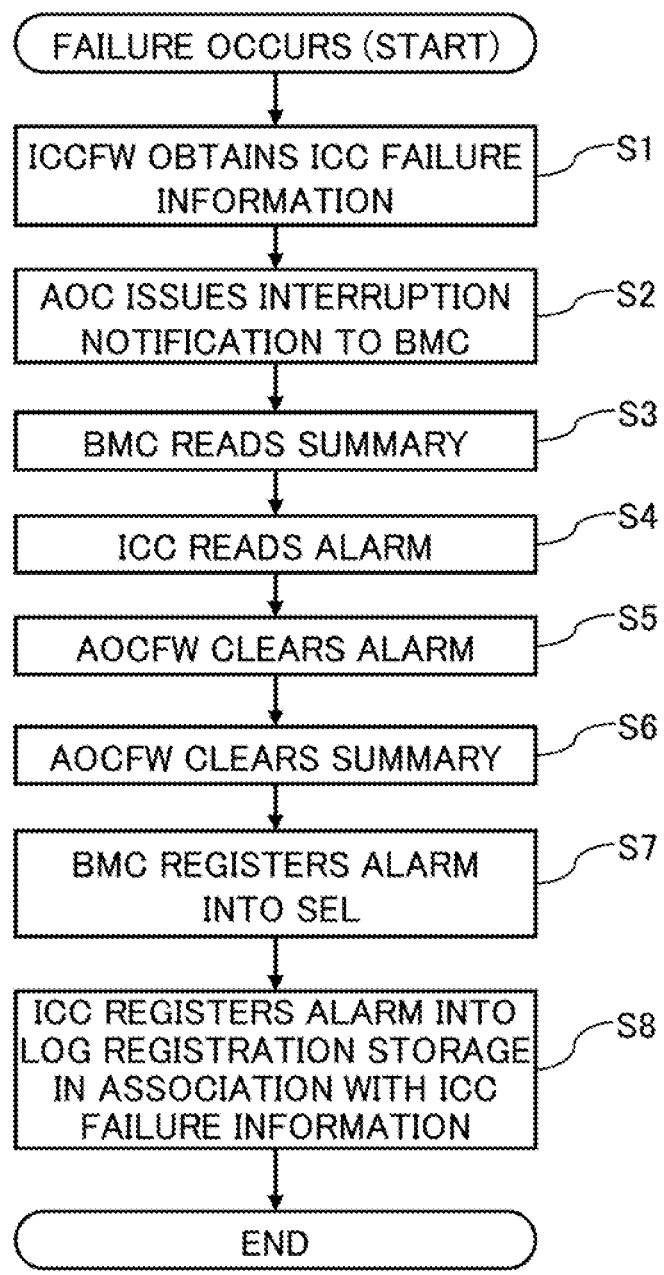
FIG. 5 is a flow diagram illustrating a succession of procedural steps performed in the inter-node communication unit of the information processing system according to an example of an embodiment when a failure occurs.

(B) Operation:

Description will now be made in relation to a process performed in the inter-node communication unit 5 of the information processing system 100 according to an example of the embodiment having the above configuration when a failure occurs with reference to a flow diagram (Steps S1-S8) of FIG. 5.

In step S1, the ICC processor 21 obtains ICC failure information from the ICC register 22 through executing the firmware (FW).

In Step S2, the ACC 3 (ACC processor 31) issues interruption notification to the BMC 10 (BMC processor 11).

In Step S3, the BMC 10 (BMC processor 11) reads the first AOC failure information 331 (SUMMARY) from the first register region 33 of the AOC register 32 through executing a BMC firmware.

In Step S4, the ICC 20 (ICC processor 215 reads the second AOC failure information 332 (ALARM) from the second register region 34 of the AOC register 32 via the AOC processor 31. Then the AOC 3 (AOC processor 31) clears the second AOC failure information 332 in the AOC register 32 through executing the AOC firmware (Step S5).

In Step S6, the AOC 3 (AOC processor 31) calculates the logical sum of the REGIONs for each address (i.e., each alarm type) of the second AOC failure information 332 in the second register region 34 of the AOC register 32. Since the second AOC failure information 332 (ALARM) in the second register region 34 has been cleared in the above Step S5, the value of the logical sum related to each alarm name is calculated to be zero. In other words, the first AOC failure information 331 (SUMMARY) in the first register region 33 is cleared.

In Step S7, the BMC 10 (BMC processor 11) registers the SUMMARY read in the above Step S3 into the SEL registration storage 12. The sequence of executing the process of Step S6 and the process of Step S7 is not limited to one described above. This means that the process of Step S7 may be performed before the process of Step S6 or may be performed in parallel with the process of Step S6.

After that, in Step S8, the ICC 20 (ICC processor 21) causes the BMC 10 (the BMC processor 11) to register the ALARM read in above Step S4 into the log registration storage 13 in combination with (in association with) the ICC failure information obtained in Step S1.

In other words, the ICC processor 21 notifies the BMC processor 11 of an instruction to store the log information. The BMC processor 11 receives the ALARM and the ICC failure information from the ICC 20 and stores, in obedience to the instruction to store the log information, the ALARM and the ICC failure information into a predetermined region of the log registration storage 13 in combination with (in association with) each other. Then the process ends.

(C) Effects:

As described above, in the information processing system 100 of an example, of the embodiment, the ACC register 32 includes the first register region 33 and the second register region 34, and registers the first AOC failure information 331 (SUMMARY) and the second AOC failure information 332 (ALARM) into the first, register region 33 and the second register region 34, respectively. In addition, even if the first AOC failure information 331 in the first register region 33 is read, the firmware of the AOC 3 does not remove the information (second AOC failure information 332 in the second register region 34.

Consequently, the register information in the AOC register 32 is not cleared because the BMC processor 11 reads only the first AOC failure information 331 (SUMMARY) from the first register region 33 of the AOC register 32. Accordingly, the collection of the second AOC failure information 332 (ALARM) in the second register region 34 of the AOC register 32 by the ICC processor 21 is correctly executed.

The BMC processor 11 registers the SUMMARY into the SEL registration storage 12. This makes the maintenance staff possible to easily grasp the details of the failure by referring to the SUMMARY in the SEL registration storage 12, so that the efficiency of the maintenance operation can be improved.

Furthermore, even if the BMC processor 11 reads the first AOC failure information 331 (SUMMARY) from the first register region 33 of the AOC register 32, the second AOC failure information 332 (ALARM) in the second register region 34 is not removed. Since the REGION of the second AOC failure information 332 (ALARM) is not removed but is retained, the maintenance staff can easily specify the point for the maintenance by referring to the REGION, so that the efficiency of the maintenance operation can be ensured and the convenience can be enhanced. For example, in cases where a failure occurs in the inter-node communication unit 5, the maintenance staff can surely grasp whether the point of occurrence of the failure is the ICC 20 or the AOC connector 30 without executing detailed analysis on the log information related to the failure.

In the AOC 3, the first AOC failure information (SUMMARY) 331 is generated by calculating the logical sum of the REGIONS for each address (alarm type) in relation to the second AOC failure information 332 (ALARM) in the second register region 34 of the AOC register 32. This makes it possible to easily generate the first AOC failure information 331 and also to easily grasp the state of occurring a failure in the AOC 3, so that convenience is enhanced.

Since the failure log in the AOC register 32 can be collected from both the BMC processor 11 and ICC processor 21, the requirement for an interrupting signal line from the AOC connector 33 to the ICC processor 21 can be eliminated, so that the production cost can be reduced.

Into the log registration storage 13, the ICC failure information that the ICC processor 21 obtains and the second AOC failure information 332 that ICC processor 21 obtains from the second register region 34 of the AOC register 32 are stored in association with each other. This eliminates the requirement of the maintenance staff for determining the interrelation between failure information, and the maintenance staff can easily obtain correlated failure information to enhance the convenience.

(D) Miscellaneous:

The disclosed technique should by no means be limited to the foregoing embodiment, but various changes and modifications can be suggested without departing the scope of the embodiment. The components and the processes of the present embodiment may be each selected or omitted according to the requirement, and may be combined appropriately.

For example, in the foregoing embodiment, the AOC processor 31 generates the first AOC failure information (SUMMARY) 331 by calculating the logical sum of the REGIONS for each address (alarm type) of the second AOC failure information (ALARM) 332 of the second register region 34 of the AOC register 32, but generation of the first AOC failure information (SUMMARY) 331 should by no means be limited to this manner. Alternatively, the AOC 3 may generate the first AOC failure information (SUMMARY) 331 by calculating the logical sum of the REGIONS for each address (alarm type) related to the second AOC failure information (ALARM) 332 using, for example, a logic circuit.

Those ordinary skilled in art can demonstrate and manufacture the present embodiment with reference to the above disclosure.

According to the embodiment, correlated failure information can be easily and surely obtained in cases where a communication failure occurs.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus comprising a manager apparatus and a communication controller apparatus and being connected to another information processing apparatus via a communication cable, wherein:

the communication cable comprising a second failure information region that stores second failure information being configured by associating each of a plurality of failure types with a value representing whether a failure occurs at each of a plurality of failure occurring points and a first failure information region that stores first failure information being a logical sum of a plurality of values each representing whether a failure occurs at one of the plurality of failure occurring points of each of the plurality of failure types in the second failure information; and in a case where a communication failure occurs the first failure information is written into the first failure information region and the second failure information is written into the second failure information region, the manager apparatus reads the first failure information from the first failure information region, the communication controller apparatus reads the second failure information from the second failure information region, after the reading of the second failure information from the second failure information region by the communication controller apparatus, the second failure information is removed from the second failure information region, and after the reading of the first failure information from the first failure information region by the manager apparatus, the first failure information is removed from the first failure information region.

2. The information processing apparatus according to claim 1, wherein even if where the first failure information stored in the first failure information region is read, the second failure information stored in the second failure information region is not removed.

3. The information processing apparatus according to claim 1, wherein the communication controller apparatus reads the second failure information from the second failure information region after the manager apparatus reads the first failure information from the first failure information region.

4. The information processing apparatus according to claim 1, wherein the manager apparatus stores failure information collected by the communication controller apparatus and the second failure information read by the communication controller apparatus from the second failure information region into a failure information storing unit in association with each other.

5. A method of collecting a communication cable log in an information processing apparatus, the information processing apparatus comprising a manager apparatus and a communication controller apparatus and being connected to another information processing apparatus via a communication cable:

the communication cable comprising a second failure information region that stores second failure information being configured by associating each of a plurality of failure types with a value representing whether a failure occurs at each of a plurality of failure occurring points and a first failure information region that stores first failure information being a logical sum of a plurality of values each representing whether a failure occurs at one of the plurality of failure occurring points of each of the plurality of failure types in the second failure information; and the method comprising:

in a case where a communication failure occurs, writing the first failure information into the first failure information region and writing the second failure information into the second failure information region;

at the manager apparatus, reading the first failure information from the first failure information region; and at the communication controller apparatus, reading the second failure information from the second failure information region, removing the second failure information from the second failure information region after the reading of the second failure information from the second failure information region at the communication controller apparatus, and removing the first failure information from the first failure information region after the reading of the first failure information from the first failure information region at the manager apparatus.

6. The method for collecting a communication cable log according to claim 5, further comprising even if where the first failure information stored in the first failure information region is read, prohibiting removal of the second failure information stored in the second failure information region.

7. The method for collecting a communication cable log according to claim 5, further comprising at the communication controller apparatus, reading the second failure information from the second failure information region after the manager apparatus reads the first failure information from the first failure information region.

8. The method for collecting a communication cable log according to claim 5, further comprising at the manager apparatus, storing failure information collected by the communication controller apparatus and the second failure information read by the communication controller apparatus from the second failure information region into a failure information storing unit in association with each other.

* * * * *